(12) United States Patent
Lee et al.

(10) Patent No.: US 7,259,806 B1
(45) Date of Patent: Aug. 21, 2007

(54) LIQUID CRYSTAL DISPLAY DEVICE WITH LIGHT ABSORBING LAYERS

(75) Inventors: Gun-Hee Lee, Kyoungsangbuk-do (KR); Dong-Young Kwak, Taegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/633,782

(22) Filed: Aug. 7, 2000

(30) Foreign Application Priority Data

Aug. 7, 1999 (KR) ................................ 1999-32448

(51) Int. Cl.
- *G02F 1/136* (2006.01)
- *G02F 1/1333* (2006.01)
- *G09G 3/36* (2006.01)
- *H01L 31/00* (2006.01)
- *H01L 29/04* (2006.01)

(52) U.S. Cl. ........................... 349/43; 349/42; 349/44; 349/110; 345/92; 257/59; 257/72

(58) Field of Classification Search ............ 349/42–44, 349/110, 111, 113; 257/59, 72; 345/92
See application file for complete search history.

(56) References Cited

U.S. PATENT DOCUMENTS

| | | | | |
|---|---|---|---|---|
| 5,450,220 A | * | 9/1995 | Onishi et al. ................. | 349/89 |
| 5,629,787 A | * | 5/1997 | Tsubota et al. .............. | 349/153 |
| 5,847,781 A | * | 12/1998 | Ono et al. ..................... | 349/44 |
| 5,936,693 A | * | 8/1999 | Yoshida et al. .............. | 349/139 |
| 5,976,684 A | * | 11/1999 | Oyama et al. ............... | 428/216 |
| 6,151,089 A | * | 11/2000 | Yang et al. .................. | 349/113 |
| 6,166,400 A | * | 12/2000 | Chang et al. ................. | 257/77 |
| 6,177,973 B1 | * | 1/2001 | Lee et al. .................... | 349/123 |
| 6,196,692 B1 | * | 3/2001 | Umemoto et al. ............ | 362/31 |
| 6,300,929 B1 | * | 10/2001 | Hisatake et al. .............. | 345/94 |
| 6,373,540 B1 | * | 4/2002 | Munakuta .................... | 349/117 |
| 6,462,654 B1 | * | 10/2002 | Sandelman et al. ......... | 340/506 |

FOREIGN PATENT DOCUMENTS

JP 02-020832 * 1/1990

* cited by examiner

*Primary Examiner*—Andrew Schechter
*Assistant Examiner*—Hoan C. Nguyen
(74) *Attorney, Agent, or Firm*—Birch, Stewart, Kolasch & Birch, LLP

(57) ABSTRACT

The present invention discloses a liquid crystal display device, comprising: a first upper substrate including: a) a switching element on the first upper substrate; b) a passivation film formed over the whole surface of the first upper substrate while covering the switching element; c) a pixel electrode on the passivation film; d) a black matrix formed on the passivation film and over the switching element; e) a color filter formed over the pixel electrode; and f) a first orientation film formed on the black matrix and the color filter and above the pixel electrode; a lower second substrate having a common electrode and a second orientation film, the orientation film formed on the common electrode; sealing the first and second substrates with a sealant and a liquid crystal layer interposed between the first upper and second lower substrates.

12 Claims, 5 Drawing Sheets ically, formed in a transverse direction and spaced apart from
LIQUID CRYSTAL DISPLAY DEVICE WITH LIGHT ABSORBING LAYERS

CROSS REFERENCE

This application claims the benefit of Korean Patent Application No. 1999-32448, filed on Aug. 7, 1999, under 35 U.S.C. § 119, the entirety of which is hereby incorporated by reference.

BACKGROUND OF THE INVENTION

1. Field of the Invention

The present invention relates to a liquid crystal display (LCD) device and a method of manufacturing the same.

2. Description of Related Art

Recently, a liquid crystal display device adopts a structure wherein a color filter and a black matrix are formed over a thin film transistor array substrate to obtain a higher aperture ratio. The liquid crystal display device having such a structure (hereinafter, referred to simply as "the C/F and BM on array structure") includes a top substrate, a bottom substrate, and a liquid crystal layer interposed between the two opposite substrates. The bottom substrate has an array of thin film transistors formed over the top surface of the bottom substrate, and both a black matrix and a color filter are formed over the thin film transistor array.

As described above, the liquid crystal display device having the C/F and BM on array structure has the advantage of a high aperture ratio. However, most of the liquid crystal display devices having the C/F and BM on array structure have an additional black matrix formed over the bottom surface of the top substrate in order to prevent a diffused reflection, or a reflection or dispersion of light.

FIG. 1 is a plan view illustrating arrangement of the thin film transistors and the pixels of the conventional liquid crystal display device having the C/F and BM on array substrate.

Referring to the FIG. 1, on a first substrate 10 of the liquid crystal display device, a plurality of gate lines 32 are arranged in a transverse direction and spaced apart from each other, and a plurality of data lines 36 are arranged in a longitudinal direction perpendicular to the gate lines 32 and spaced apart from each other. Pixel electrodes A1 to A9 are respectively formed over an area defined by the two adjacent gate lines 32 and two adjacent data lines 36, and thin film transistors 20 are respectively formed near cross points of the gate lines 32 and the data lines 36.

Each of the thin film transistors 20 has a gate, a source, and a drain electrode. The gate electrode, the source electrode and the drain electrode are electrically connected with the gate line 32, the data line 36, and the pixel electrode, respectively.

FIG. 2 is a cross sectional view showing the typical transmissive liquid crystal display device having the C/F and BM on array structure. Referring to FIG. 2, in the conventional liquid crystal display device, a second substrate 50 (as an upper substrate) is aligned with the first substrate 10 (as a lower substrate), a liquid crystal layer 60 is interposed between the two opposite substrates 10 and 50, and a back light device 80 is positioned under the first substrate 10.

On the first substrate 10, a gate electrode 22 of the thin film transistor 20 is formed, and a gate insulating layer 42 is formed on the exposed surface of the substrate 10 while covering the gate electrode 22.

On the gate insulating layer 42, a semiconductor island 24 of the thin film transistor 20 is formed over the gate electrode 22, and an ohmic contact layer 26 of the thin film transistor 20 is formed on the semiconductor island 24.

Further, the source and the drain electrodes 28a and 29b (spaced apart from each other) are formed covering the ohmic contact layer 26 over the semiconductor island 24, and a passivation film 48 is formed covering the thin film transistors 20, and has a contact hole 30 on a predetermined portion of the drain electrode 28b. The pixel electrode 102 is formed on the passivation film 48 and is electrically connected with the corresponding drain electrode 28b through the corresponding contact hole 30. A first black matrix 46 is formed on a portion of the passivation film 48 over the TFT.

Color filter 104 of red (R), green (G) and blue (B) are formed on the corresponding pixel electrode 102, respectively. FIG. 2 shows only the color filter layers G and R.

On the color filter 104 and the black matrix 46, a first orientation film 44 is formed and faced with liquid crystal layer 60.

On the bottom surface of the second substrate 50, a second black matrix 56 is formed. The second black matrix 56 has the almost same shape as the black matrix 46 of the first substrate 10. A common electrode 52 is formed to cover the second black matrix 56.

On the bottom surface of the common electrode 52, a second orientation film 54 is formed and faced with the liquid crystal 60.

At this point, the first black matrix 46 of the first substrate 10 serves to prevent light from passing through the gap between the gate line 32 and the pixel electrode 102 and the data line 36 and the pixel electrode 102, and shield the thin film transistors 20 from incident light. In other words, the first black matrix and the color filter are usually formed at the substrate having the thin film transistors in order to improve the aperture ratio by minimizing an alignment margin which is employed when the first and second substrates 10 and 50 are aligned with and fixed to each other.

However, the second black matrix 56 of the second substrate 50 is adopted to prevent a degradation of a contrast ratio, or a variation of the colors. The variation of colors may occur when elements of dispersed light passing through the respective color filter layers are mixed in a region of the adjacent color filter layer. It is preferred that the width of the second black matrix 56 is narrower than that of the first black matrix 46 in order not to affect the alignment margin.

Though the width of the second black matrix 56 is narrower than that of the first black matrix 46, since both the first and the second substrates have the first and second black matrices, respectively, the substrate-aligning process is complicated, leading to increase in alignment error. That is to say, the addition of the second black matrix results in an addition of an inferiority factor to the substrate-aligning process.

Further, the number of processes for forming the second black matrix 56 at the second substrate is increased due to the addition of the additional black matrices 56.

For the foregoing reason, there is a need for a liquid crystal display device that is free from the effect of the dispersion reflection, and has a high aperture ratio and a simplified substrate-aligning process.

SUMMARY OF THE INVENTION

It is an objective of the present invention to provide a liquid crystal display device having a high image quality of contrast, high aperture ratio and a simplified substrate-aligning process.

The present invention discloses a liquid crystal display device, comprising:

an upper substrate including: a) a switching element on the upper substrate; b) a passivation film formed over the whole surface of the upper substrate while covering the switching element; c) a pixel electrode on the passivation film; d) a black matrix formed over the switching element; e) a color filter formed over the pixel electrode; and f) a first orientation film formed on the black matrix and the pixel electrode; a lower substrate having a common electrode and a second orientation film, the orientation film formed on the common electrode; and a liquid crystal layer interposed between the upper and lower substrates.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to a preferred embodiment of the present invention, examples of which are illustrated in the accompanying drawings.

Figure 1:
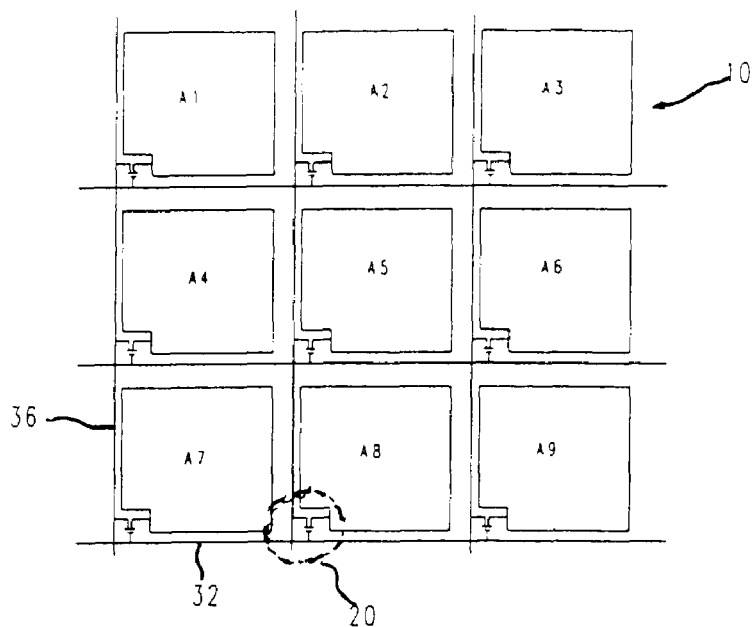
FIG. 1 is a plan view illustrating arrangement of the thin film transistors and the pixels of the conventional liquid crystal display device.
Figure 2:
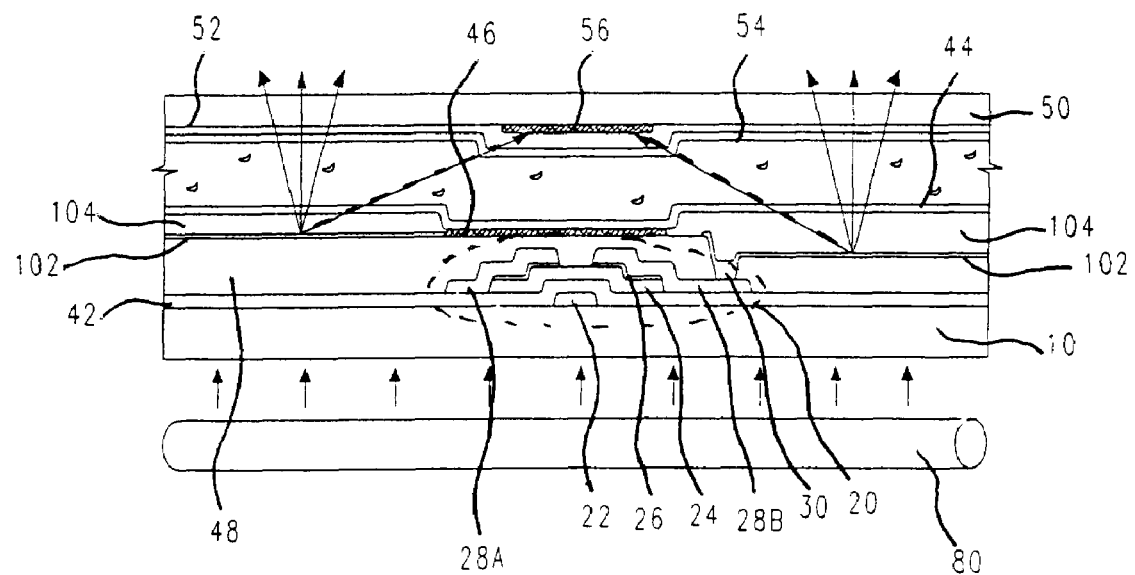
FIG. 2 is a partial cross-sectional view illustrating the conventional liquid crystal display device.
Figure 3:
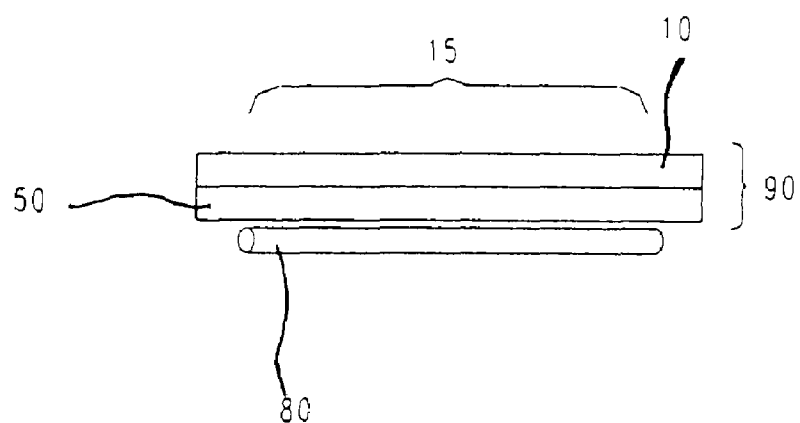
FIG. 3 is a simplified cross-sectional view illustrating a configuration of the liquid crystal display device according to a preferred embodiment of the present invention.

FIG. 3 is a schematic view illustrating a transmissive liquid crystal display device according to a preferred embodiment of the present invention. As shown in FIG. 3, the transmissive liquid crystal display device according to the preferred embodiment of the present invention includes a back light device 80 and a liquid crystal panel 90. The liquid crystal display panel 90 has a first substrate 10 and a second substrate 50 with a liquid crystal layer (not shown) interposed there-between. The liquid crystal display panel 90 is located over the back light device 80 so that a bottom surface of the second substrate 50 is adjacent to the back light device 80.

As the upper substrate, the first substrate 10 has pixel electrodes, thin film transistors as a switching element, color filters, and a black matrix disposed between boundaries of the color filters. As the lower substrate, the second substrate 50 has a common electrode.

Figure 4:
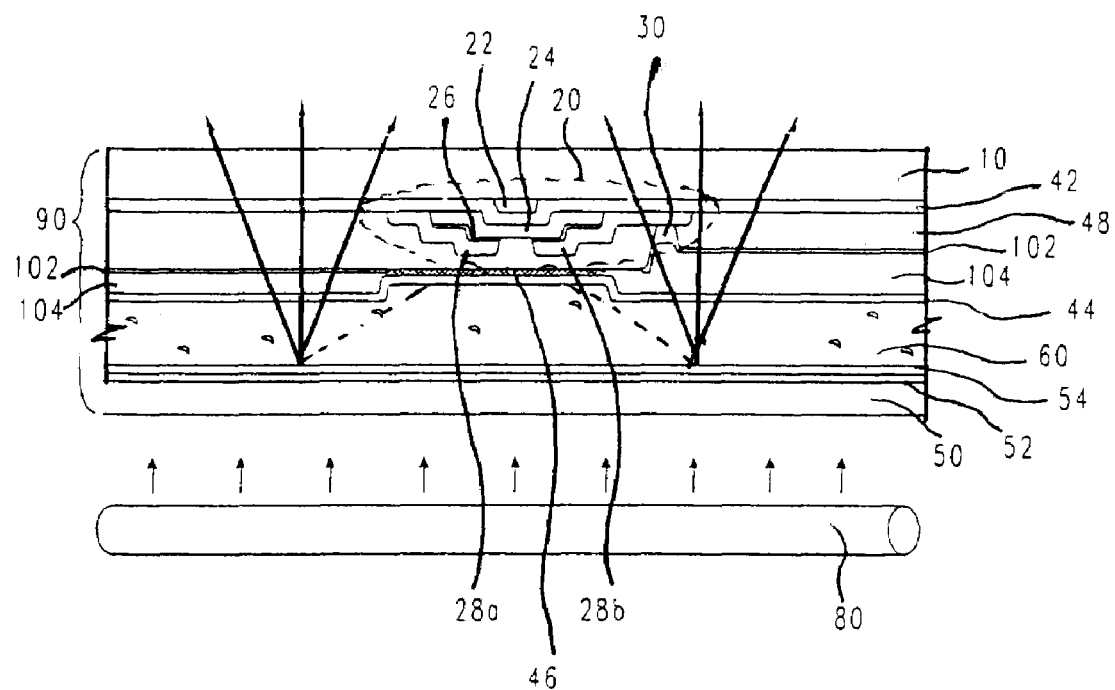
FIG. 4 is a partial cross-sectional view illustrating a liquid crystal display device according to a preferred embodiment of the present invention.

FIG. 4 is a cross sectional view illustrating the transmissive liquid crystal display device according to the preferred embodiment of the present invention. As shown in FIG. 4, an upper substrate 10 has a thin film transistor, a black matrix 46, a pixel electrode 102 and a color filter 104. The upper substrate 10 is the one in which the thin film transistor array substrate is turned upside down. The thin film transistor 20 has a gate electrode 22, a semiconductor layer 24, an ohmic contact layer 26, a source electrode 28a and a drain electrode 28b. To manufacture the upper substrate 10, first the gate electrode 22 is formed on the upper substrate 10, and then a gate insulating layer 42 is formed on the exposed bottom surface of the upper substrate 10 while covering the gate electrode 22. The gate electrode 22 extends from the gate line (not shown) and made of Al or Cr, and the gate insulating layer is made of an inorganic or organic material. The semiconductor layer 24 in the form of an island is formed over the gate electrode 22, and the ohmic contact layer 26 is formed on the semiconductor layer 24 by ion-doping. The source and drain electrodes 28a and 28b are formed to overlap the ohmic contact layer 26, respectively. The source and drain electrode 28a and 28b are made of Al or Cr. The source electrode 28a extends from the data line (not shown). Then, a passivation film 48 is formed over the whole surface of the upper substrate 10 while covering the source and drain electrodes 28a and 28b. The passivation film 48 is made of an inorganic or organic material. The passivation film 48 has a contact hole 30 on a predetermined portion of the drain electrode 28b. The pixel electrode 102 is formed on the passivation film 28 and is electrically connected with the drain electrode 28b through the contact hole 30. The pixel electrode 102 is made of indium tin oxide (ITO). The black matrix 46 is formed over the TFT and the gate and data lines, and the color filter 104 is formed over the pixel electrode 102. Finally, a first orientation film 44 is formed covering the black matrix 46 and color filter 104. After manufacturing, the thin film transistor array substrate 10 is turned upside down to align with the lower substrate 50.

The black matrix 46 prevent light of the back light device 80 from passing through the gaps between the gate line and the pixel electrode and the data line and the pixel electrodes. Also, the black matrix 46 shields the thin film transistors from incident light and prevents the mixing of dispersed portions of light passing through the respective color filter layers. The mixing of the light passing through the respective color filters results in degradation of a contrast ratio or variation of the colors. To maximize an aperture ratio, the pixel electrodes may overlap the gate and data lines so that the black matrix is formed only over the thin film transistor. Since the gaps are excluded, the black matrices have a smaller size, serving only to shield the thin film transistors from the light of the back light device 80, and thus the aperture ratio becomes maximized. In that case, the gate and data lines prevent the above-mentioned light leakage and the mixing of the disposed portion of light passing through the respective color filter layers.

Further, the first orientation film 44 is preferably made of a polyimide film.

The lower substrate 50 has a common electrode 52 and a second orientation film 54 formed on the common electrode 52. The common electrode 52 is preferably made of a transparent conductive material like indium tin oxide (ITO), and the second orientation film 54 is preferably made of a polyimide film.

When the upper and lower substrates 10 and 50 are aligned with each other and sealed by a sealant, the liquid crystal is injected into a gap between the upper and lower substrates 10 and 50 so that the liquid crystal layer 60 is interposed between the first and second orientation film 44 and 54.

As described above, by using the thin film transistor array substrate 10 turned upside down as the upper substrate, the degradation of the contrast resulting from the mixing of the dispersed light can be prevented.

Further, since the second substrate has only the common electrode 52 and the second orientation film 44 without additional black matrices, a process of aligning the two substrates becomes simplified. That is to say, when aligning the upper substrate having the black matrices with the lower substrate having no black matrices, an alignment margin of the aligning process is not affected by the black matrices of the lower substrate.

On the contrary, when aligning the upper substrate having the black matrices with the lower substrate having another black matrices, an alignment margin of the aligning process is affected by a relative position between the black matrices of the upper substrates and the black matrices of the lower substrate.

Figure 5:
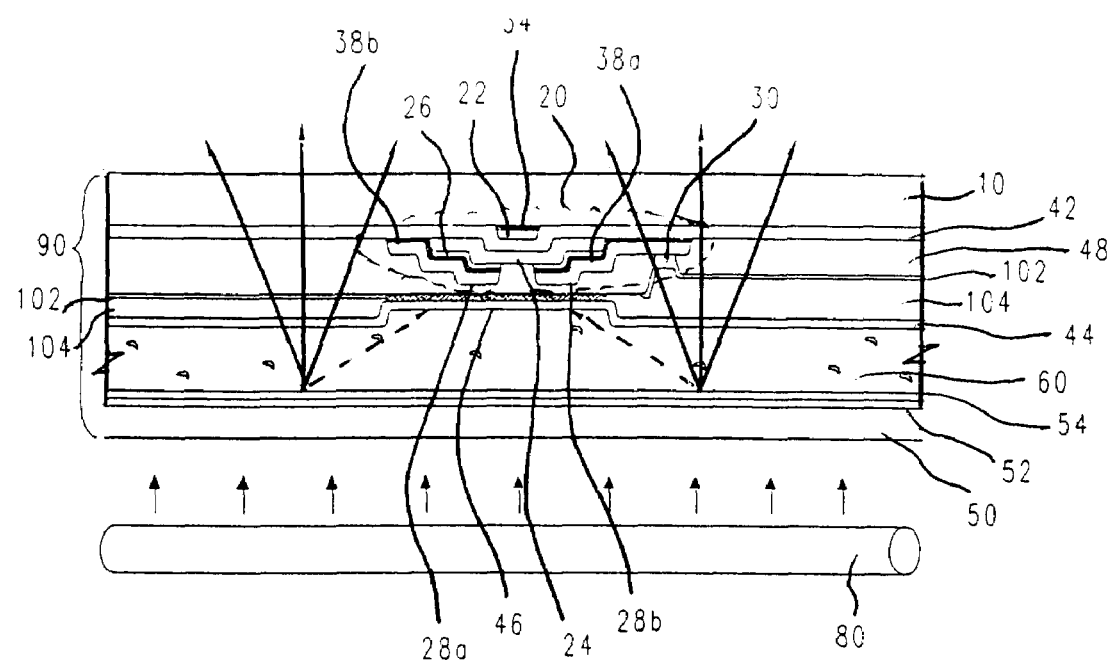
FIG. 5 is a partial cross-sectional view illustrating a modification of the liquid crystal display device according to a preferred embodiment of the present invention.

FIG. 5 shows a modification of the liquid crystal display device according to a preferred embodiment of the present invention.

As shown in FIG. 5, in order to prevent a reflection of incident light from the gate electrode, the source electrode, the drain electrode, and the gate and data lines, a gate light absorbing film 34, a source light absorbing film 38a, and a drain light absorbing film 38b are formed under the gate electrode 22, the source electrode 28a, and the drain electrode 28b, respectively. Further, the source light absorbing film 38a shields the data line (not shown) from incident light, and the gate light absorbing film 34 shields the gate line (not shown) from incident light. The light absorbing films 34, 38a and 38b are made of a low reflectance material such as an oxidation film, or a nitride film, and a black resin.

In other words, after a first light absorbing film for the gate light-absorbing pattern 24 is deposited on the first substrate 10, a first metal layer for the gate electrodes 18 and the gate lines such as aluminum or chromium is deposited on the light absorbing film. Then, the light absorbing film and the first metal layer are patterned at the same time so as to form the gate light-absorbing layer 34, the gate electrodes 22 and the gate lines (not shown).

Further, before a second metal layer for the source and the drain electrodes 28a and 28b and the data lines are deposited, a second light absorbing film is deposited over an gate insulating layer 42 so as to cover an ohmic contact layer 26. Then, the second metal layer is deposited on the second light absorbing film, and the second metal layer and the second light absorbing film are patterned at the same time so as to form the source and drain light-absorbing films 38a and 38b, the data lines, and the source and the drain electrodes 28a and 28b.

Natural light incident to a top surface of the first substrate 10 is not reflected by metal patterns of the first substrate 10 such as the gate electrodes 22, the gate lines, the data lines, and the source and the drain electrodes 28a and 28b because the gate light absorbing film 34 and the source and drain light-absorbing films 38a and 38b absorb the natural incident light. Thus, a dazzling problem that the reflected light dazzles the eyes of an observer is greatly reduced.

Figure 6:
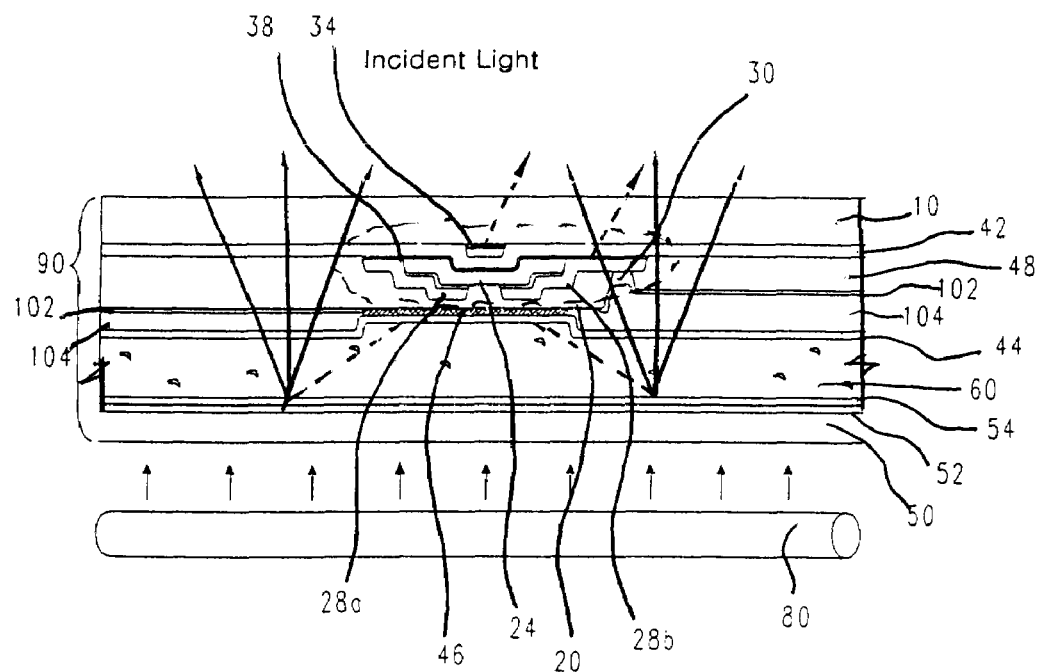
FIG. 6 is a partial cross-sectional view illustrating another modification of the liquid crystal display device according to a preferred embodiment of the present invention.
Figure 7:
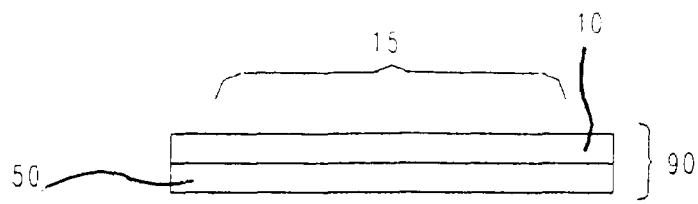
FIG. 7 is a simplified cross-sectional view illustrating a configuration of the liquid crystal display device according to a preferred embodiment of the present invention.
Figure 8:
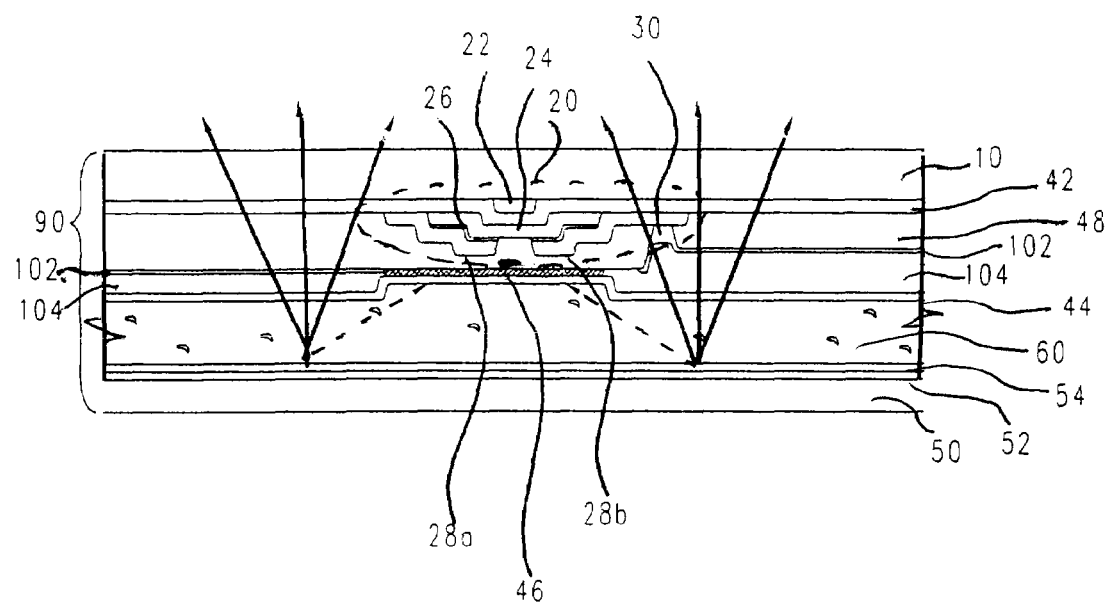
FIG. 8 is a partial cross-sectional view illustrating a liquid crystal display device according to another preferred embodiment of the present invention.
Figure 9:
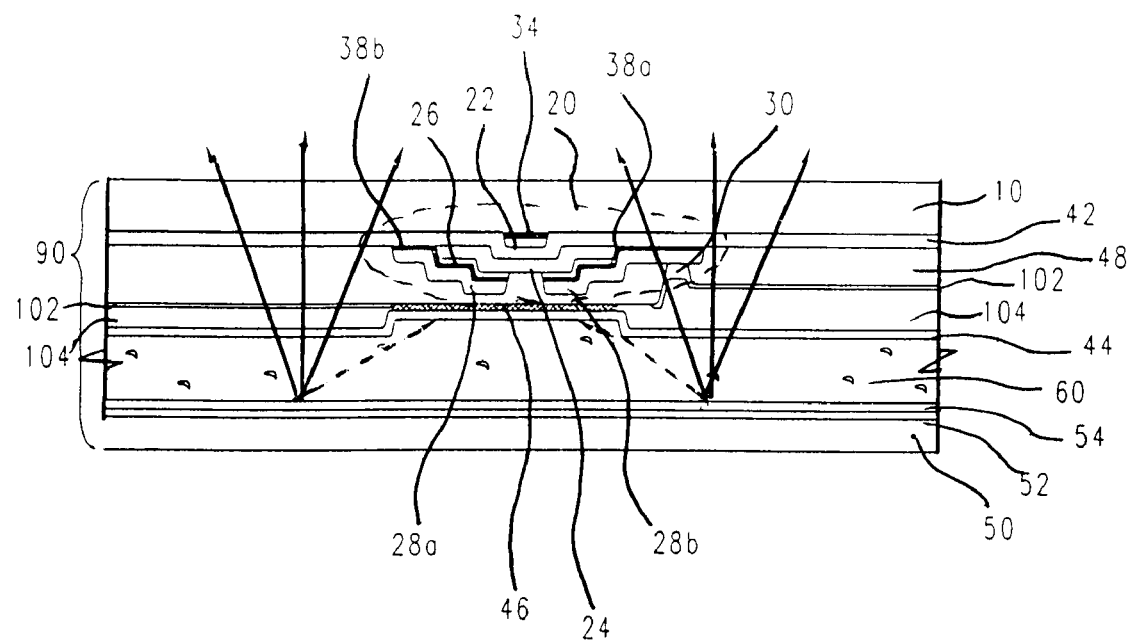
FIG. 9 is a partial cross-sectional view illustrating a modification of the liquid crystal display device according to another preferred embodiment of the present invention.
Figure 10:
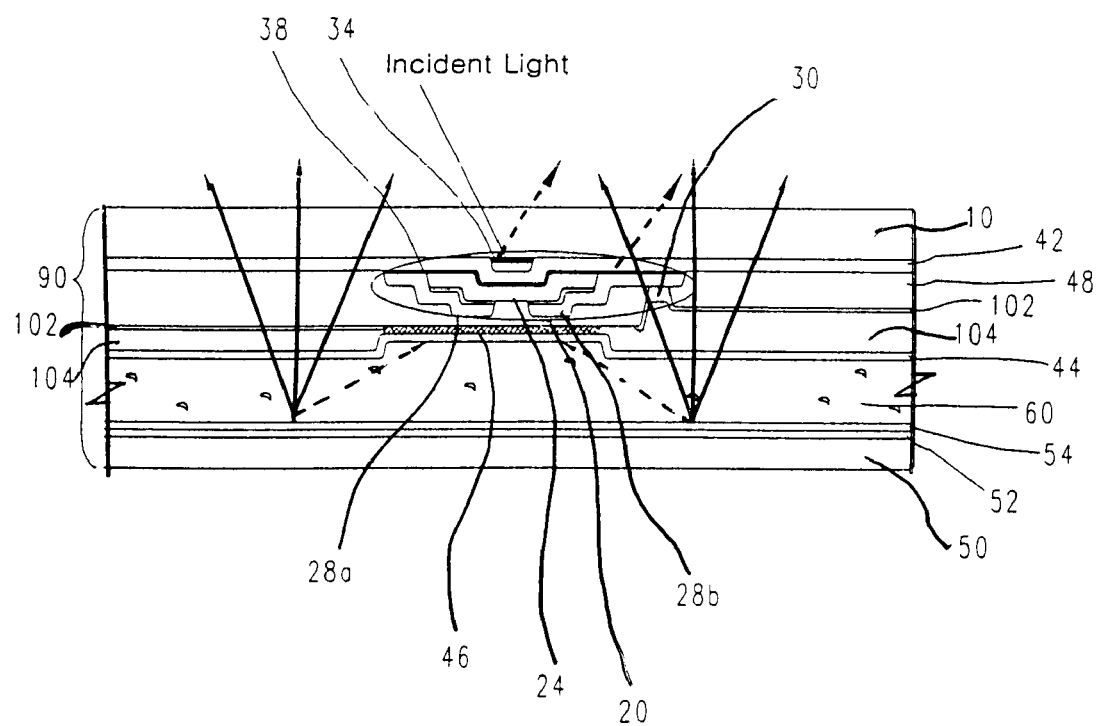
FIG. 10 is a partial cross-sectional view illustrating another modification of the liquid crystal display device according to another preferred embodiment of the present invention.

FIG. 6 shows another modification of the liquid crystal display device according to the preferred embodiment of the present invention.

As shown in FIG. 6, the data light-absorbing pattern 38 is formed between a gate insulating layer 42 and a semiconductor layer 24. That is to say, before a semiconductor layer 24 is deposited, the second light absorbing film is deposited on the gate insulating layer 42 and patterned so as to form the data light-absorbing pattern 38.

Hereinbefore, the preferred embodiment of the present invention is explained centering on the transmissive liquid crystal display device, but the preferred embodiment of the present invention can be also directed to the reflective liquid crystal display device. FIGS. 7 to 10 shows the reflective liquid crystal display device according to the preferred embodiment of the present invention. The reflective liquid crystal display device according to this preferred embodiment of the present invention has the same configuration as the transmissive liquid crystal display device, except that the back light device 80 is not present, and the common electrode 52 is made of an opaque conductive material. Therefore, the detailed explanation for the reflective liquid crystal display device according to the preferred embodiment of the present invention is omitted for the sake of the simplicity.

As described herein before, according to the preferred embodiment invention, the liquid crystal display device can have a high aperture ratio, a high display quality and a high contrast ratio. Further, the liquid crystal display device can be manufactured by a simplified process. Besides, the dazzling of the screen due to the reflection of incident light can be prevented.

The present invention is not intended to be limited to the specific form set forth herein, but on the contrary, it is intended to cover such alternatives, modifications, and equivalents, as can be reasonably included within the spirit and scope of the invention.

What is claimed is:

1. A liquid crystal display device, comprising:
   a display panel including a lower layer at the lowest portion of the display panel and an uppermost layer, positioned above the lowest layer at the uppermost portion of said display panel;
   a first substrate forming said uppermost layer of said display panel, including:
   a) a switching element on the first substrate, said switching element being connected to a gate line and a data line, the switching element being a thin film transistor having a gate electrode formed on the first substrate, a gate insulating layer formed on an exposed surface of the first substrate while covering the gate electrode, an active layer on the gate insulating layer over the gate electrode, an ohmic contact layer on the active layer, and a source electrode on the ohmic contact layer, a drain electrode on the ohmic contact layer;
   b) a passivation film formed over the whole surface of the first substrate while covering the switching element;
   c) a pixel electrode on the passivation film;
   d) a black matrix formed on the passivation film and over the switching element;
   e) a color filter formed over the pixel electrode; and f) a first orientation film formed on the black matrix and the color filter and above the pixel electrode;

a second substrate having no switching element disposed thereon, forming said lowest portion of the display panel, said second substrate being aligned with the first substrate, said second substrate having a common electrode and a second orientation film, said second orientation film being formed on the common electrode;

a sealant for sealing said first and second substrates;

a liquid crystal layer interposed between said first and second substrates; and a backlight device disposed beneath said second substrate such that said second substrate is located between said backlight device and said first substrate, wherein the thin film transistor further includes a gate light absorbing film formed only under the gate line and the gate electrode, a source light absorbing film formed only under the source electrode and the data line, and a drain light absorbing film formed only under the drain electrode.

2. The liquid crystal display device of claim 1, wherein the source electrode overlaps one end portion of the active layer, and the drain electrode overlaps the other end portion of the active layer.

3. The liquid crystal display device of claim 1, wherein the back light device is for supplying light to the liquid crystal layer.

4. The liquid crystal display device of claim 3, wherein the common electrode and the pixel electrode are made of indium tin oxide (ITO).

5. The liquid crystal display device of claim 1, wherein the common electrode and the pixel electrode are made of a transparent material.

6. The liquid crystal display device of claim 1, wherein the light absorbing films absorb natural incident light to reduce reflected light dazzle.

7. The method of claim 1, wherein the light absorbing films absorb natural incident light to reduce reflected light dazzle.

8. The liquid crystal display device of claim 1, wherein the light absorbing films each comprise a low reflectance material selected from the group consisting of an oxidation film, a nitride film and a black resin.

9. A method of manufacturing a liquid crystal display device which comprises an array of thin film transistors, an array of pixel electrodes and a backlight device, said method including:

forming a gate line and a gate electrode on a first substrate said first substrate forming the uppermost layer of a display panel, the gate electrode extending from the gate line;

forming a gate insulating layer on the exposed surface of the upper substrate while covering the gate line and the gate electrode;

forming an active layer on the gate insulating layer over the gate electrode;

forming an ohmic contact layer on the active layer;

forming a data line and source and drain electrodes, the source electrode on the ohmic contact layer and overlapping one end portion of the active layer, the drain electrode on the ohmic contact layer and overlapping the other end portion of the active layer, the source and drain electrodes spaced apart from each other, the source electrode extending from the data line, said gate, source and drain electrodes comprising a thin film transistor formed on said first substrate;

forming a gate light absorbing film only under the gate electrode and the gate line;

forming a source light absorbing film formed only under the source electrode and the data line;

forming a drain light absorbing film only under the drain electrode;

forming a passivation film over the whole surface of the first substrate while covering the source and drain electrodes, the passivation film having a contact hole on the drain electrode;

forming a pixel electrode on the passivation film, the pixel electrode electrically connected with the drain electrode through the contact hole;

forming a color filter on the pixel electrode;

forming a black matrix over the thin film transistor;

forming a first orientation film on the color filters and the black matrices;

forming a common electrode on a second substrate;

forming a second orientation film on the common electrode;

aligning the first substrate turned upside down with the second substrate with a gap between the first substrate and the second substrate so that the thin film transistor is also turned upside down and the first orientation film of the first substrate is opposite to the second orientation film of the second substrate;

sealing the first and second substrates with a sealant;

injecting a liquid crystal between the first substrate and the second substrate; and positioning said backlight device beneath said second substrate such that said second substrate is located between said backlight device and said first substrate.

10. The method of claim 9, wherein the common electrode and the pixel electrode are made of indium tin oxide.

11. The method of claim 9, wherein the common electrode and the pixel electrode are made of a transparent material.

12. The method of claim 9, wherein the light absorbing films each comprise a low reflectance material selected from the group consisting of an oxidation film, a nitride film and a black resin.

* * * * *